(12) United States Patent
Dooi et al.

(10) Patent No.: US 7,148,840 B2
(45) Date of Patent: Dec. 12, 2006

(54) RADAR APPARATUS, RADAR APPARATUS CONTROLLING METHOD

(75) Inventors: Yoshikazu Dooi, Kawasaki (JP); Satoshi Ishii, Kawasaki (JP); Hiroyuki Yatsuka, Osato (JP); Nobukazu Shima, Kobe (JP); Masaki Hitotsuya, Kobe (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/999,974

(22) Filed: Dec. 1, 2004

(65) Prior Publication Data

US 2006/0012511 A1    Jan. 19, 2006

(30) Foreign Application Priority Data

Jul. 13, 2004    (JP)    ............... 2004-205920

(51) Int. Cl.
*G01S 13/38*    (2006.01)
*G01S 13/10*    (2006.01)
*G01S 13/32*    (2006.01)
*G01S 13/93*    (2006.01)

(52) U.S. Cl. ............... 342/131; 342/27; 342/28; 342/118; 342/128; 342/130; 342/132; 342/147; 342/158; 342/175; 342/195; 342/196

(58) Field of Classification Search ............... 342/27, 342/28, 70–72, 82, 89–103, 118, 128–144, 342/175, 188–198, 145–147, 158; 180/167–169; 701/300, 301
See application file for complete search history.

(56) References Cited

U.S. PATENT DOCUMENTS 2,965,896 A    12/1960    Wright 3,611,370 A * 10/1971 Frasure et al. ............ 342/128
3,611,377 A * 10/1971 Rittenbach ................ 342/128
3,688,313 A *  8/1972 Kern ........................ 342/89
3,878,525 A *  4/1975 Alpers ...................... 342/132
4,003,049 A *  1/1977 Sterzer et al. .............. 342/70
4,130,821 A * 12/1978 Goldie ...................... 342/198
5,045,856 A *  9/1991 Paoletti ..................... 342/70
5,087,918 A *  2/1992 May et al. .................. 342/70
5,517,197 A *  5/1996 Algeo et al. ............... 342/70

(Continued)

FOREIGN PATENT DOCUMENTS

JP    6-2499944    9/1994

(Continued)

OTHER PUBLICATIONS

Fujimoto and Ida, "Millimeter Wave Radar System for Automobile", NEC Technical Journal, vol. 54, No. 7, Jul. 25, 2001.

(Continued)

*Primary Examiner*—Bernarr E. Gregory
(74) *Attorney, Agent, or Firm*—Staas & Halsey LLP

(57) ABSTRACT

A radar apparatus comprises: a transmitter unit having a high-frequency oscillating unit whose oscillation frequency is variable, and a pulse amplitude modulating unit for amplitude-modulating a pulse of a transmission high-frequency signal output from the high-frequency oscillating unit with a first control pulse signal; a receiver unit having a gating unit for controlling ON/OFF of an input of a received high-frequency signal with a second control pulse signal; and a controlling and signal processing unit for controlling the transmitter unit and the receiver unit, and for switching a first operation mode for making the apparatus function as an FM-CW radar, and a second operation mode for making the apparatus function as a pulse radar.

14 Claims, 14 Drawing Sheets

U.S. PATENT DOCUMENTS

| | | | | |
|---|---|---|---|---|
| 5,898,401 | A | * | 4/1999 | Walls .......................... 342/82 |
| 5,987,395 | A | | 11/1999 | Donges et al. |
| 6,873,250 | B1 | * | 3/2005 | Viana et al. .................. 342/70 |
| 2003/0142010 | A1 | | 7/2003 | Ogawa et al. |
| 2003/0146826 | A1 | | 8/2003 | Viana et al. |

FOREIGN PATENT DOCUMENTS

| | | |
|---|---|---|
| JP | 8-170985 | 7/1996 |
| JP | 8-179036 | 7/1996 |
| JP | 11-258340 | 9/1999 |
| JP | 2000-292530 | 10/2000 |

OTHER PUBLICATIONS

Andre Zander, Volkswagen AG, et al., "A Multifunctional Automotive Short Range Radar System", URL:http://www.smart-microwave-sensors.de/GRS_2000_Multifunctional_Short_Range_Radar_System.pdf, Jul. 1, 2004.

Search Report for corresponding European Appln. No. 04028856.5 dated Mar. 2, 2006.

RivenQ-Menhaj, et al., "Combining Two Radar Techniques to Implement a Collision Avoidance System", Measurement Science and Technology, IOP, Bristol, GB, vol. 9, No. 8, Aug. 1998.

Akihiro Kajiwara, "Ranging for Stepped-FM Coded Radar", Electronics & Communications in Japan, Part III, Fundamental Electronic Science, Wiley, Hoboken, NJ, vol. 82, No. 8, Aug. 1999, pp. 14-20.

Notice of Rejection Grounds for corresponding Korean Appln. No. 10-2004-0103039 dated Aug. 11, 2006.

Search Report for corresponding European Appln. No. 04028856.5 dated Sep. 9, 2006.

* cited by examiner

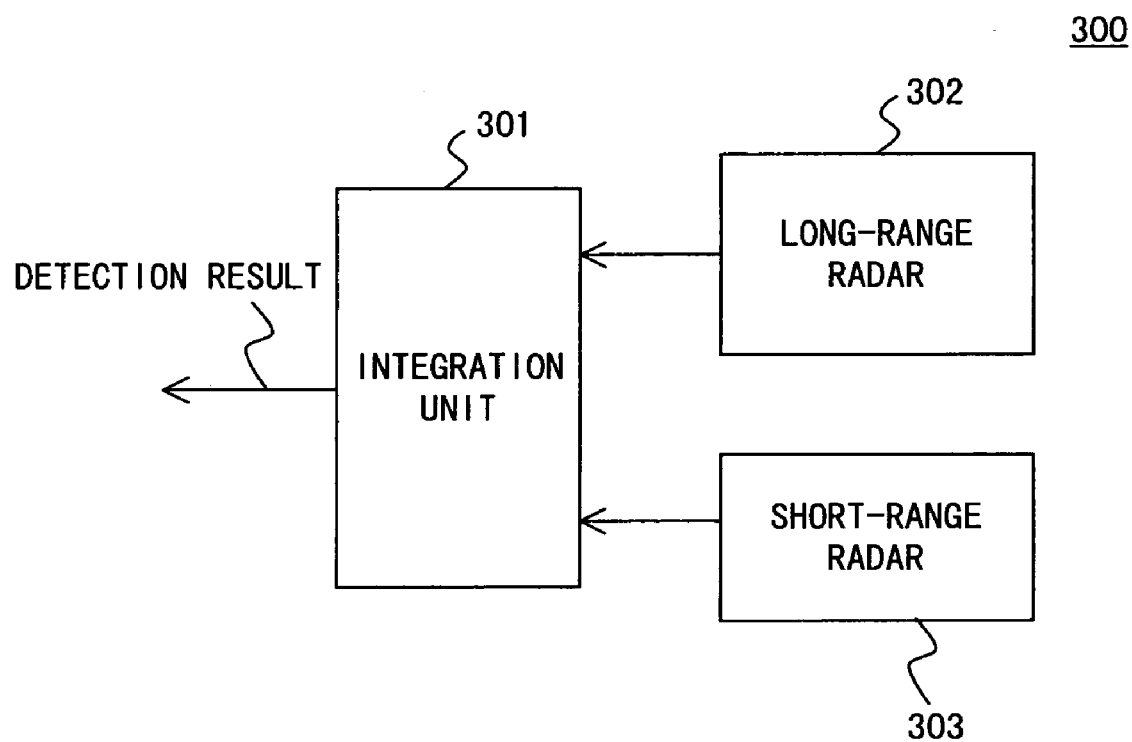
F I G. 1

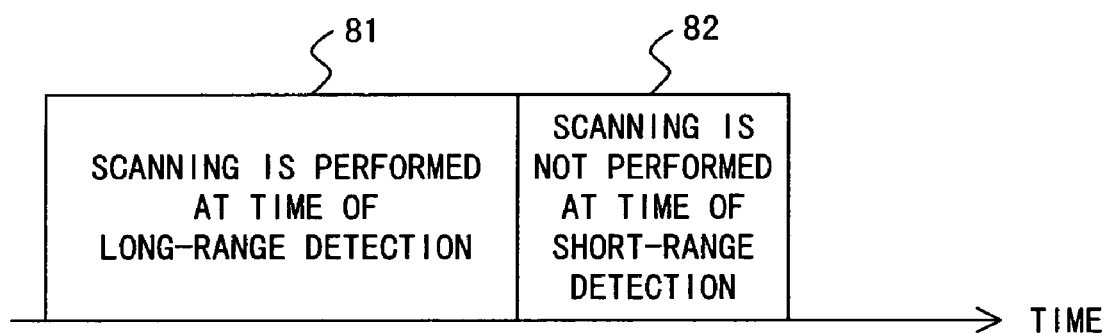
F I G. 14

RADAR APPARATUS, RADAR APPARATUS CONTROLLING METHOD

BACKGROUND OF THE INVENTION

1. Field of the Invention

The present invention relates to a radar technique, and more particularly, to an effective technique being applied to detect a target positioned in a wide range from a long to short range.

2. Description of the Related Art

Attention is paid to a millimeter wave radar technique intended to observe, for example, an obstruction on a road, and a traffic condition in operation management the car with the radar.

A conventional FM-CW (Frequency Modulation-Continuous Wave) radar system can detect a target in a distance range of several meters to a hundred and several tens of meters, but has a difficulty in the detection of a target in an extremely short range such as approximately 10 centimeters with the same degree of accuracy. In the meantime, an ultra-short pulse radar system can detect a target in a distance range of approximately 10 centimeters to a ten and several meters with high accuracy, but has a difficulty in the detection of a target in a distance range of 100 meters or more.

As described above, an FM-CW radar and an ultra-short pulse radar are totally different radar systems. Accordingly, two different radars are conventionally required to comprise detection performance in long and short ranges of a distance.

A long- and short-range radar 300 into which two radar apparatuses are combined is exemplified in FIG. 1 as a reference technique of the present invention. FIG. 1 shows an example where a long-range radar 302 is an FM-CW radar according to a conventional technique, a short-range radar 303 is a pulse radar using an UWB (Ultra Wide Band) technique, detection signals from both of the radars are combined by a integrated unit 301, and detection results covering from long to short ranges are externally output.

As the long-range detection radar, an FM-CW radar is most common. Non-Patent Document 1 discloses a radar of an RF frequency of a 76-GHz band, and a detection distance range of 4 to 120 meters.

Short-range radars are under development mainly in Europe and the United States. For example, like Non-Patent Document 2, a UWB system of an RF frequency of a 24-GHz band and a distance of approximately 0.1 to 20 meters is targeted.

The detection system that covers a short to long range and is configured by simply using such two radars according to these existing techniques is the above described FIG. 1. Such a system has a disadvantage that its configuration becomes complex, and its cost becomes expensive in comparison with a case where a detection system is implemented with one apparatus.

In the meantime, Patent Document 1 discloses a radar transmitter/receiver for detecting a long-range target with an FM pulse radar system, and for detecting a short-range target with an FM-CW radar system.

However, as recited in the above described Non-Patent Documents 1 and 2, the FM-CW radar system is effective for a long range of 3 to 100 meters, whereas the pulse radar system is effective for a short range of 0.1 to 20 meters. Therefore, the radar transmitter/receiver disclosed by Patent Document 1 is inconsistent with the common knowledge of techniques in this field. Namely, for the FM-CW radar, if a detection distance is very short such as 1 meter or less, a beat frequency obtained from transmission and reception signal becomes very low, and it becomes difficult to accurately count the frequency. Additionally, it is difficult to discriminate the two targets that approach in a range of several tens of centimeters. For example, if 20 centimeters is required as a discrimination of a distance, a frequency modulation deviation is approximately 750 MHz. However, it is very difficult to manufacture the linear FM modulator which has low modulation distortion with the frequency deviation of 750 MHz, and an FM oscillator for implementing this FM modulation becomes very expensive. Furthermore, it is difficult to implement an FM modulator that is claimed by Patent Document 1, and makes high-speed FM switching with a short pulse, and its radar system and configuration are different from those of a system which can implement a pulse radar mode with amplitude modulation according to the present invention.

[Non-Patent Document 1] "Fujimoto and Ida, "Millimeter Wave Car-Mounted Radar System, NEC Technical Journal Vol. 54, No. 7/2001", Jul. 25, 2001

[Non-Patent Document 2] Andre zanderVolkswagenAG et al., "A Multifunctional Automotive Short Range Radar System", [online] [search on Jul. 1, 2004], <URL: http://www.smart-microwave-sensors.de/GRS_2000_Multifunctional_Short_Range_Radar_Systems.pdf>

[Patent Document 1] Japanese Patent Publication Laid-open No. 11-258340

SUMMARY OF THE INVENTION

An object of the present invention is to provide a radar apparatus that can detect a target in a wide range from a long to short range with one apparatus at low cost.

A first aspect of the present invention provides a radar apparatus comprising: a transmitter unit having a high-frequency oscillating unit whose oscillation frequency is variable, and a pulse amplitude modulating unit for amplitude-modulating a pulse of a transmission high-frequency signal output from the high-frequency oscillating unit with a first control pulse signal; a receiver unit having a gating unit for turning on and off an input of a received high-frequency signal with a second control pulse signal; and a controlling unit for controlling the transmitter unit and the receiver unit, and for switching between a first operation mode for making the apparatus function as an FM-CW radar and a second operation mode for making the apparatus function as a pulse radar.

A second aspect of the present invention provides a method for controlling a radar apparatus for detecting a target by detecting a wave, which is reflected from the target, of a transmission high frequency emitted from a transmitter unit, comprising: detecting the target while switching between a first operation mode for frequency-modulating and emitting the transmission high frequency and a second operation mode for amplitude-modulating and emitting the transmission high frequency.

According to the present invention, a long- and short-range radar which conventionally requires two long- and short-range radars can be implemented with only one radar. Accordingly, comparing with a configuration using three apparatuses, where long- and short-range radars, which are managed by one more integrated apparatus, a size and cost are reduced to one third. As a result, a radar apparatus which can detect a target in a wide range from a long to short range at low cost can be provided, and there is an effect that a use range of the radar apparatus is significantly widened.

BRIEF DESCRIPTION OF THE DRAWINGS

FIG. 1 is a block diagram showing a configuration of a long- and short-range radar apparatus, which is a reference technique of the present invention;

FIG. 14 is a conceptual schematic exemplifying a time-division method for switching the operation modes in the radar apparatus according to the preferred embodiment of the present invention.

DESCRIPTION OF THE PREFERRED EMBODIMENTS

Preferred embodiments according to the present invention are described in detail below with reference to the drawings.

Figure 2:
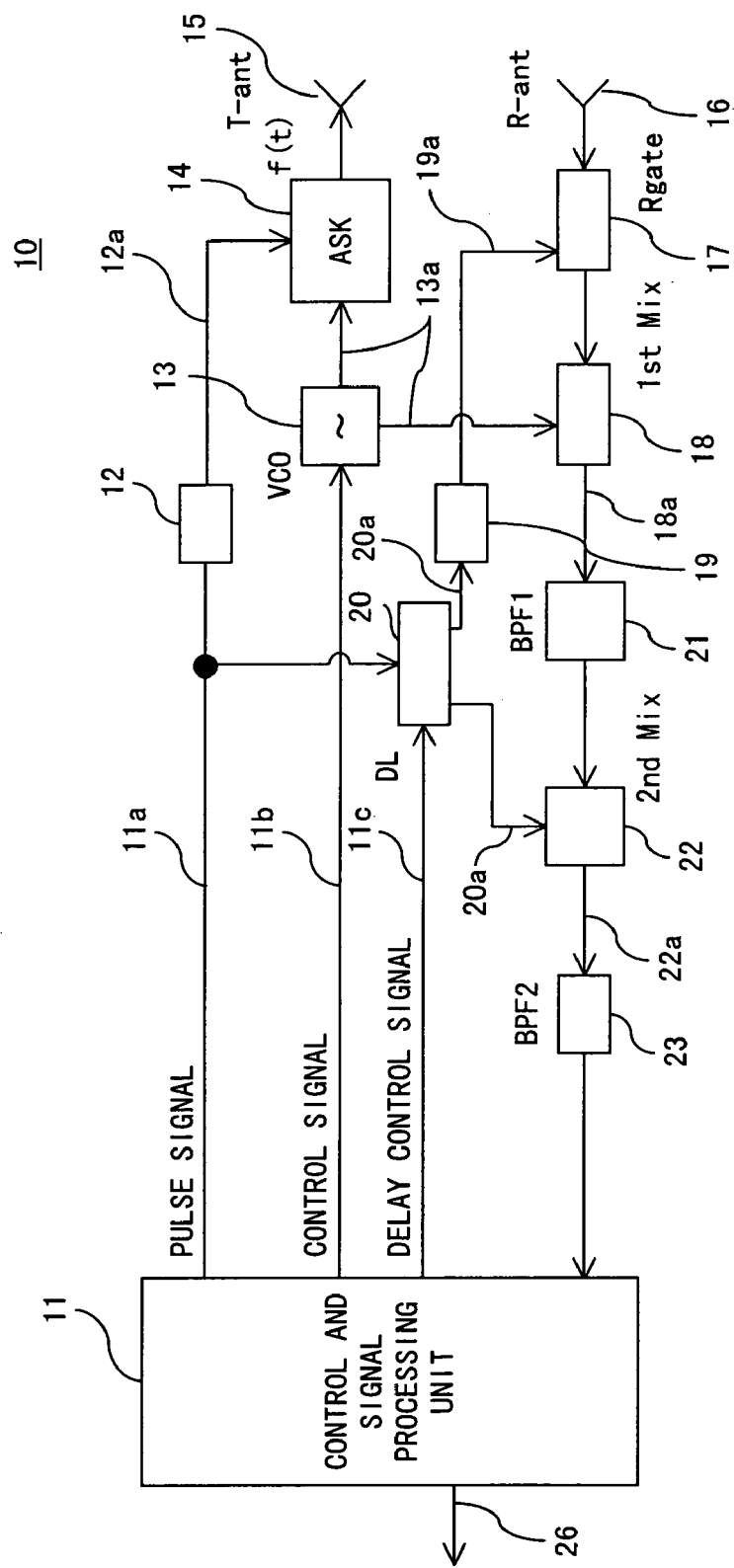
FIG. 2 is a block diagram exemplifying a configuration of a radar apparatus according to a preferred embodiment of the present invention.

FIG. 2 is a block diagram exemplifying a configuration of a radar apparatus according to a preferred embodiment of the present invention. FIGS. 3 to 6 are schematics exemplifying an action of the radar apparatus.

The radar apparatus according to this preferred embodiment comprises: a transmitting unit having a transmitter high-frequency FM modulation oscillator 13, a transmitter high-frequency ASK switching circuit 14, a short pulse generation circuit 12, and a transmitter antenna 15; a receiving unit having a receiving antenna 16, a receiver high-frequency gate circuit 17, a first mixer 18 (first frequency converter), a short pulse generation circuit 19, a programmable delay circuit 20, a band-pass filter 21 (first band-pass filter), a second mixer 22 (second frequency converter), and a band-pass filter 23 of a beat frequency band (second band-pass filter); and a control and signal processing unit 11 for controlling the whole of the apparatus.

The transmitter high-frequency FM modulation oscillator 13 of the transmitting unit is configured, for example, by a VCO (Voltage Control Oscillator), etc., whose oscillation frequency varies by an input control voltage, and makes frequency modulation for outputting a transmitter high-frequency signal 13a whose frequency varies by a voltage waveform of an FM waveform signal 11b such as a triangular wave, etc., which is input from the control and signal processing unit 11.

The transmitter high-frequency ASK switching circuit 14 makes amplitude modulation by turning on and off the transmitter high-frequency signal 13a which is output from the transmitter high-frequency FM modulation oscillator 13 and output to the transmitter antenna 15. Namely, the short pulse generation circuit 12 generates a control pulse 12a (first control pulse signal) having the same cycle as a pulse signal 11a, and a designed pulse width ratio (duty ratio) of ON to OFF synchronized by the pulse signal 11a input from the control and signal processing unit 11, and feeds the generated pulse to the transmitter high-frequency ASK switching circuit 14, so that the pulse width of amplitude modulation made by the transmitter high-frequency ASK switching circuit 14 is controlled.

In the meantime, the receiver high-frequency gate circuit 17 of the receiving unit controls ON/OFF operation (gating) for capturing the reception high-frequency, which is input from the receiving antenna 16. The gating pulse 19a (second control pulse signal) is supplied from the programmable delay circuit 20 and the short pulse generation circuit 19. Namely, the programmable delay circuit 20 delays the pulse signal 11a to 20a, controlled by the delay control signal 11c from the control and signal processing unit 11, and supply the delayed signal to the short pulse generation circuit 19 and the second mixer 22. The short pulse generation circuit 19 generates a gating pulse 19a having the same cycle as the rectangular wave signal 20a output from the programmable delay circuit 20, and a different pulse width (duty ratio) of ON to OFF, and controls the gating operation of the receiver high-frequency gate circuit 17.

The first mixer 18 mixes the gated receiving high-frequency signal and the transmitter high-frequency signal 13a which is the output of the transmitter high-frequency FM modulation oscillator 13. And then the first mixer 18 generates an IF (intermediate wave) signal 18a.

The band-pass filter 21 selectively passes a signal of an IF band from the IF signal 18a, and inputs the passed signal to the second mixer 22 at the succeeding stage. The second mixer 22 mixes the IF signal 18a and the rectangular wave signal 20a, and generates a signal component 22a of a beat signal which includes information such as a relative speed and a distance between a target and the radar apparatus. With this configuration, frequencies and phases of the IF signal 18a and the rectangular wave signal 20a can be always made to be synchronized, and the output of the second mixer can be always kept as the maximum value of the beat signal even if the phase of the IF signal varies by being slide of receiver gating. This is because the frequencies and the phases of the IF signal 18a and the rectangular wave signal 20a are synchronized. Namely, the maximum value of the beat signal can be obtained only with an I component among I and Q components of the output of the second mixer. The band-pass filter 23 selectively passes the band of the signal component 22a, and outputs the passed component to the control and signal processing unit 11.

The control and signal processing unit 11 comprises an A/D converter, a DSP, a microcomputer, etc., and has a function for executing computations such as IQ detection of the signal component 22a, FFT, a sum of absolute values in a predetermined time section, a sum of squares, etc., and for output results of the signal processing of the detection result information 26 such as a distance, a relative speed of a target, etc. to a higher-order computer system, etc.

One example of an action of the radar apparatus according to this preferred embodiment is described below.

In the radar apparatus shown in FIG. 2, in the FM-CW radar mode for long-range detection, a triangular wave is supplied from the control and signal processing unit 11 to the transmitter high-frequency FM modulation oscillator 13 (VCO) as the FM waveform signal 11b, and FM-CW modulation mode is selected. All of pulses of the control pulse 12a input to the transmitter high-frequency ASK switching circuit 14 (ASK) are set to 1, so that a continuous wave is transmitted.

Figure 3:
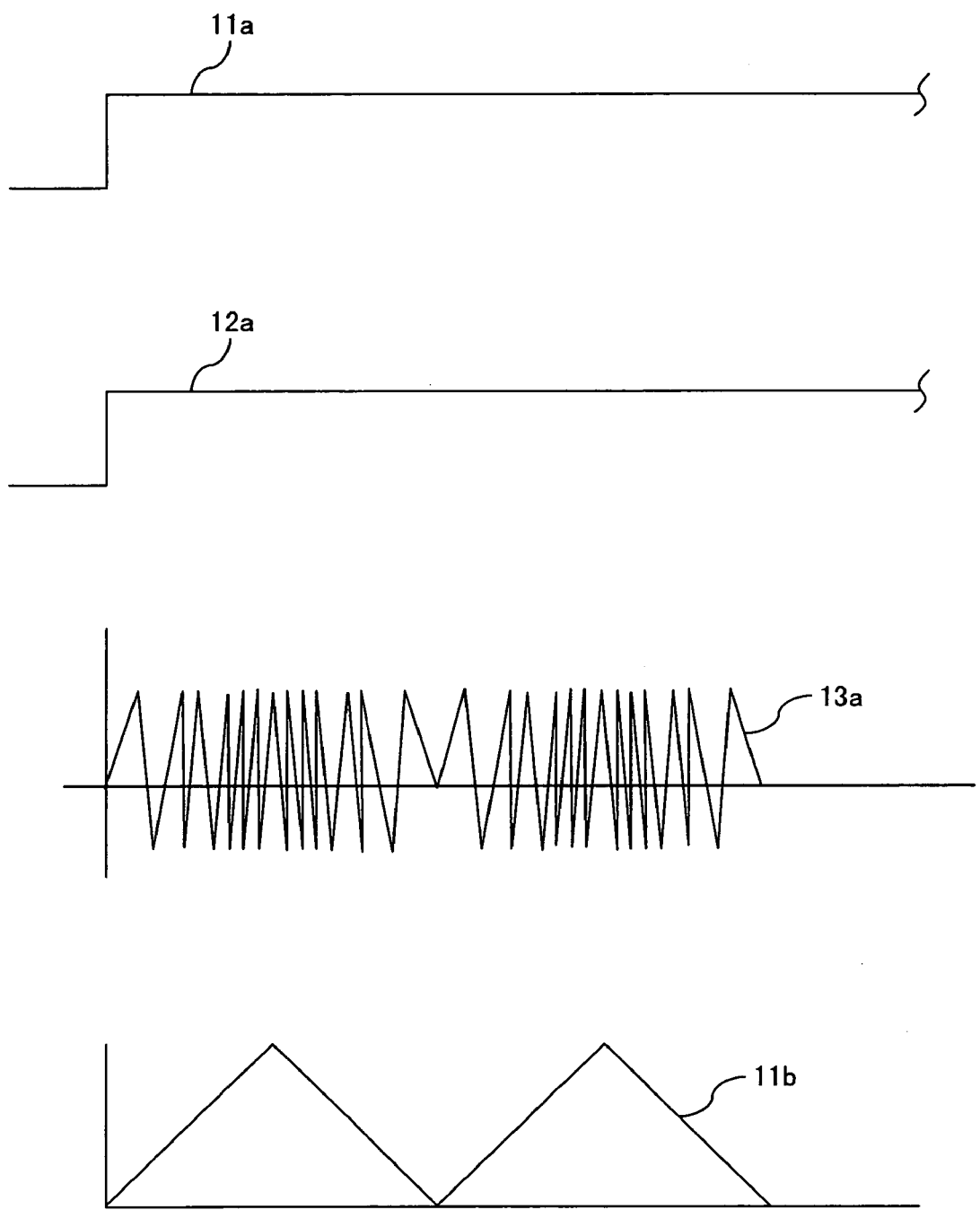
FIG. 3 is a diagram exemplifying an action of a transmitting unit in an FM-CW radar mode of the radar apparatus according to the preferred embodiment of the present invention.

Namely, as shown in FIG. 3, the pulse signal 11a all of whose pulses are 1 is input from the control and signal processing unit 11 to the short pulse generation circuit 12, and the control pulse 12a that is continuously ON is input from the short pulse generation circuit 12 to the transmitter high-frequency ASK switching circuit 14. Therefore, the transmitter high-frequency signal 13a that is frequency-modulated by the transmitter high-frequency FM modulation oscillator 13 at the preceding stage is continuously output from the transmitter high-frequency ASK switching circuit 14 to the transmitter antenna 15.

In the meantime, the receiver high-frequency gate circuit 17 (Rgate) switches between ON and OFF for capturing the receiver high-frequency with a gating pulse 19a of a 50-percent duty, which is generated from the rectangular wave signal 20a via the programmable delay circuit 20 and the short pulse generation circuit 19.

After the receiver high-frequency signal captured from the receiver high-frequency gate circuit 17 is mixed by the first mixer 18 with the transmitter high-frequency signal 13a output from the transmitter high-frequency FM modulation oscillator 13 on the transmitting unit side, and converted into the IF signal 18a of an intermediate wave band. The signal passes the band-pass filter 21 which passes the IF signal 18a, is mixed by the second mixer 22 with the rectangular wave signal 20a via the programmable delay circuit 20, and input to the control and signal processing unit 11 as a beat signal. In the FM-CW radar mode, a delay time of the programmable delay circuit 20 is constant in terms of time, and is not required to be changed.

Figure 4:
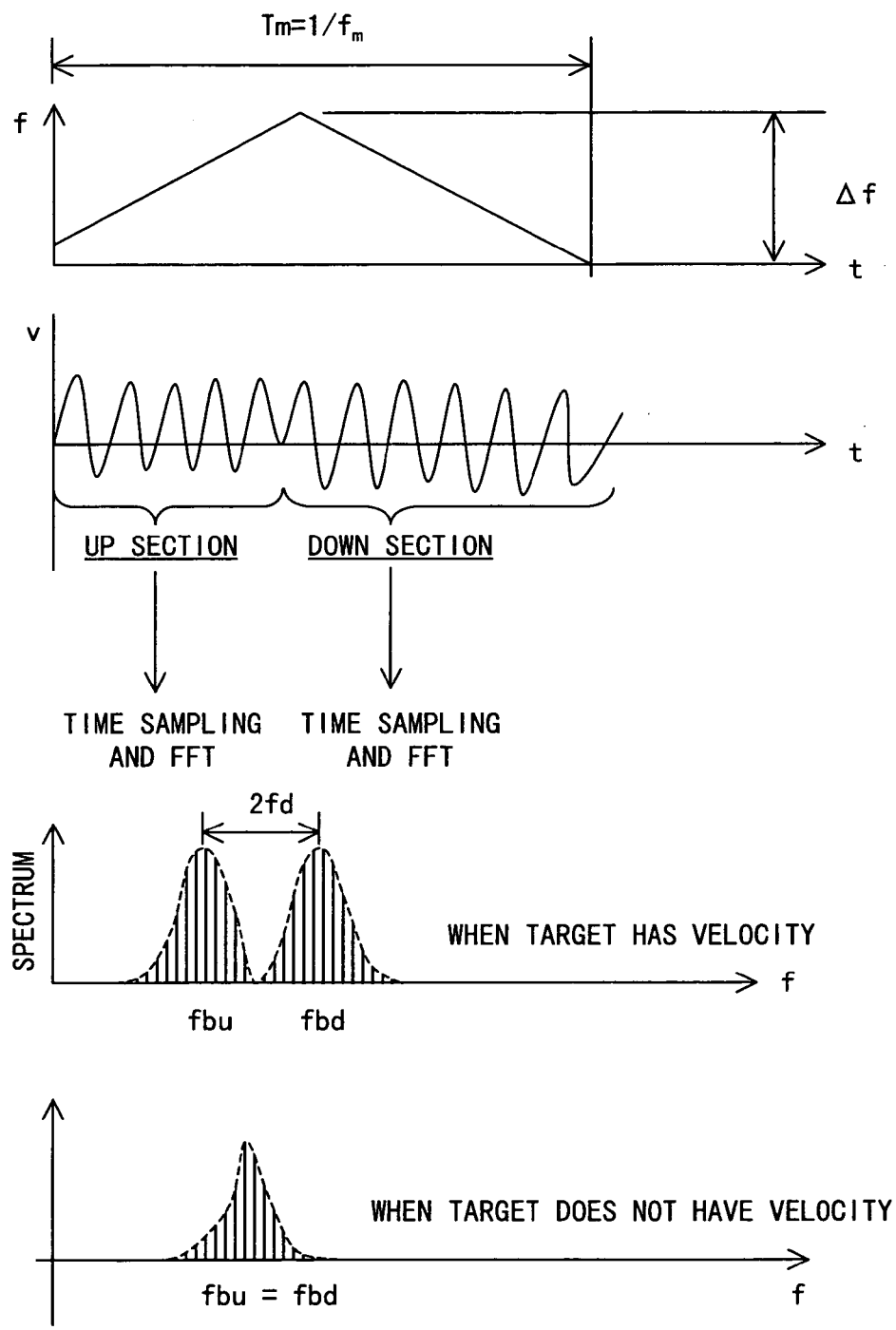
FIG. 4 is a diagram exemplifying an action of a receiving unit in the FM-CW radar mode of the radar apparatus according to the preferred embodiment of the present invention.

In the control and signal processing unit 11, The beat signal is converted to the digital data by A/D, and determines a peak frequency by performing FFT (Fast Fourier Transform), and calculates a distance to the target as shown in FIG. 4.

Namely, assuming that R is the distance to the target, and V is the relative speed of the target from the radar, c is the velocity of light, $\Delta f$ is a modulation width of frequency modulation, $f_m$ is a modulation cycle of the frequency modulation, $f_{bu}$ is a frequency at a rise of the triangular wave of the beat signal, $f_{bd}$ is a frequency at a fall of the triangular wave of the beat signal, $f_d$ is a Doppler frequency, $f_R$ is a beat frequency, a relationship among $f_R$, $f_d$, $f_{bu}$, and $f_{bd}$ is represented by the following equations (1) and (2).

$$f_{bu} = f_R - f_d \tag{1}$$

$$f_{bd} = f_R + f_d \tag{2}$$

$f_R$ and $f_d$ are respectively represented by the following equations (3) and (4).

$$f_R = \frac{4\Delta f \cdot f_m R}{c} \tag{3}$$

$$f_d = \frac{2f_o v}{c} \tag{4}$$

The equation (3) is resolved for R as represented by an equation (5), so that the distance to the target can be obtained.

$$R = \frac{Cf_R}{4\Delta f \cdot f_m} \tag{5}$$

Additionally, the equation (4) is resolved for V, so that the relative speed V of the target can be obtained. Information of the distance R and the relative speed V are output as the detection result information 26.

The reason why the receiver high-frequency signal is switched by the above described receiver high-frequency gate circuit 17 is as follows. Namely, if the beat signal is directly extracted by the first mixer 18, an S/N ratio at a short range deteriorates due to 1/f noise of an RF circuit such as the first mixer 18 and the FM modulation oscillator 13, etc., but the output of the first mixer 18 once becomes an intermediate frequency whose central frequency is equal to the switch frequency of the receiver high-frequency gate circuit 17, its low frequency including the 1/f noise is cut off by the band-pass filter 21, and the beat signal 22a having no 1/f noise can be detected by the I/Q detector (second mixer 22) after all. Then, this beat signal is A/D-converted by the control and signal processing unit 11, the FFT is performed to determine a peak frequency as shown in FIG. 4, and the distance to the target is calculated.

Figure 5:
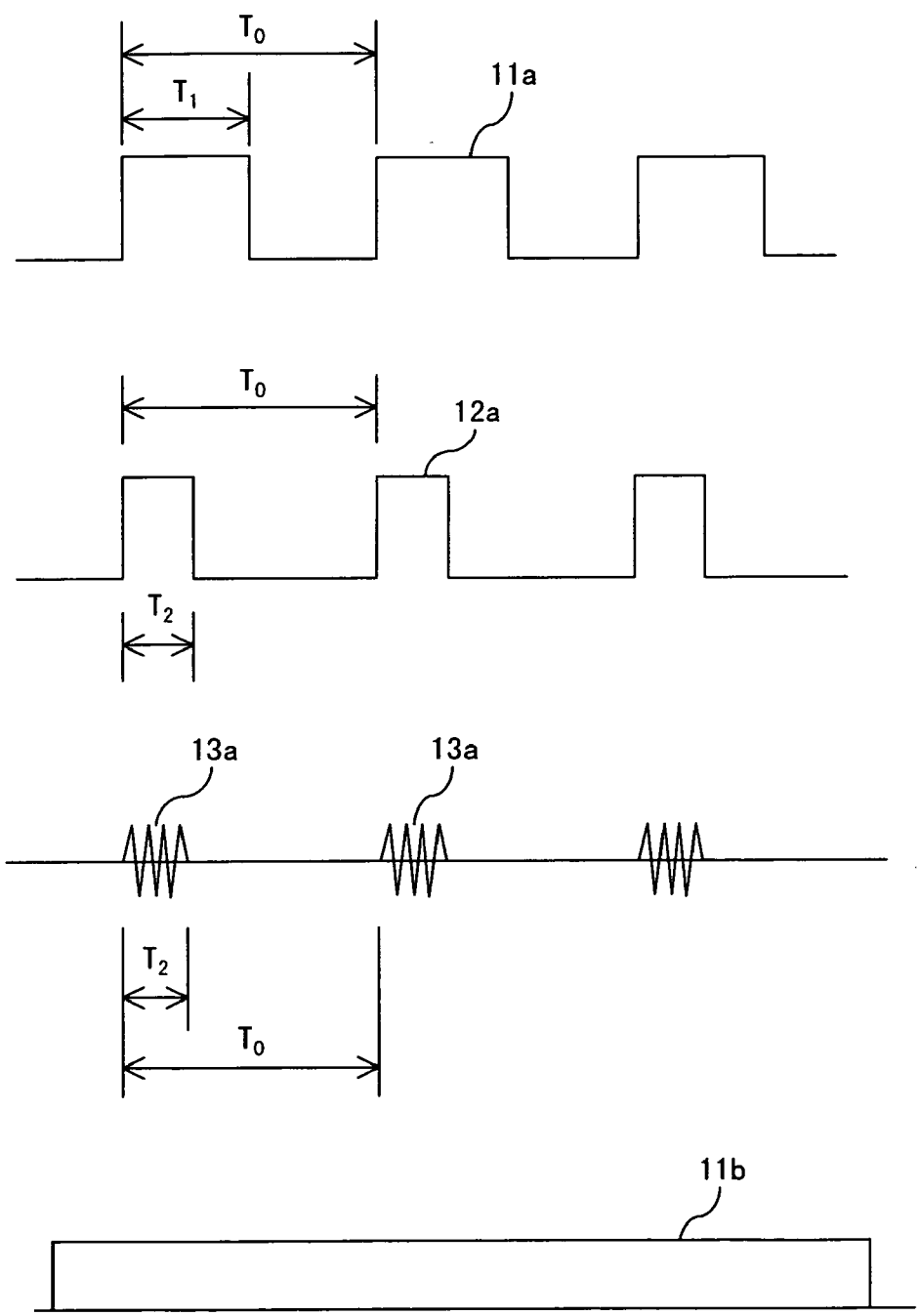
FIG. 5 is a diagram exemplifying an action of a transmitting unit in a pulse radar mode of the radar apparatus according to the preferred embodiment of the present invention.
Figure 6:
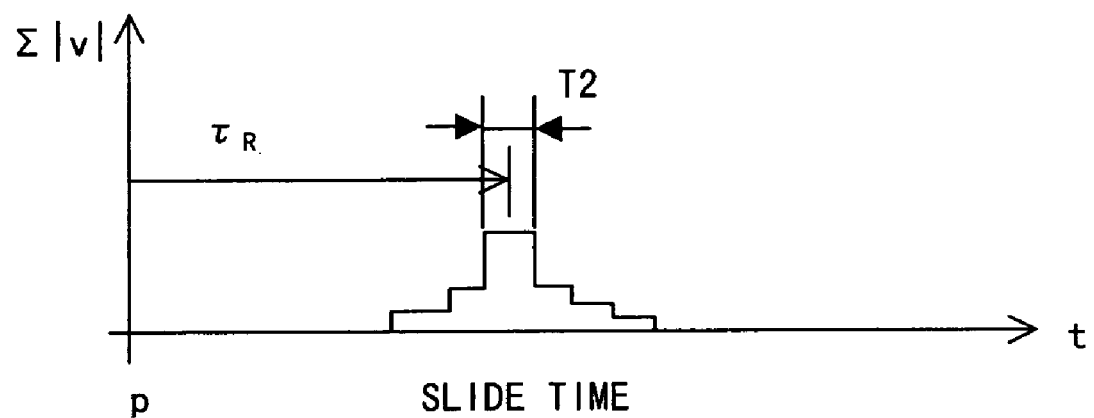
FIG. 6 is a diagram exemplifying an action of a receiving unit in the pulse radar mode of the radar apparatus according to the preferred embodiment of the present invention.

In the pulse radar mode for short-range detection, as shown in FIG. 5, the FM waveform signal 11b having a constant DC value is supplied from the control and signal processing unit 11 to the transmitter high-frequency FM modulation oscillator 13 (VCO), and the signal is kept as an unmodulated continuous wave (CW). Pulses of the pulse signal 11a input to the short pulse generation circuit 12 are implemented as repetitive pulses of "1010", and the signal becomes a rectangular wave having a short pulse width (short ON duration $T_2$) by the circuit 12. And its short pulse drives the transmitter high-frequency ASK switching circuit 14 (ASK). As a result, the transmitter high-frequency signal 13a having the constant frequency within the T2 duration among the period of T0 is output to the transmitter antenna 15.

In the receiver high-frequency gate circuit 17 (Rgate) of the receiving unit, a signal is gated with the gating pulse 19a having a short pulse (ON duration $T_2$) that is almost equal to the pulse width of the transmitter. Additionally, timing of the gating pulse 19a is slid by the programmable delay circuit 20 according to an instruction from the control and signal processing unit 11, and the receiver high-frequency signal passes from the gate circuit 17 only when the gating pulse 19a fits the propagation delay time of the transmitter high-frequency signal to the target. The signal then passes through the first mixer 18, the band-pass filter 21, the second mixer 22, and the band-pass filter 23, and is A/D-converted by the control and signal processing unit 11. Next, a summation of absolute values of signal levels in the time section (ON duration $T_2$) during which the receiver signal is continuous is obtained, the distance to the target is calculated with an equation (6) by using a delay time $\tau_R$ with which the value of the summation indicates a peak, and its result is output as the detection result information 26.

$$\tau_R = \frac{2R}{c} \quad (6)$$

In the configuration shown in FIG. 2, in the FM-CW radar mode, the control pulse 12a to the transmitter high-frequency ASK switching circuit 14 of the transmitting unit can be implemented as a pulse having a duty ratio of 50 percent (ON duration $T_1$/cycle $T_0$)×100(%)=50%), and 14a and 19a pulse which drives the receiver high-frequency gate circuit 17 (Rgate) is reverse in polarity.

Figure 7:
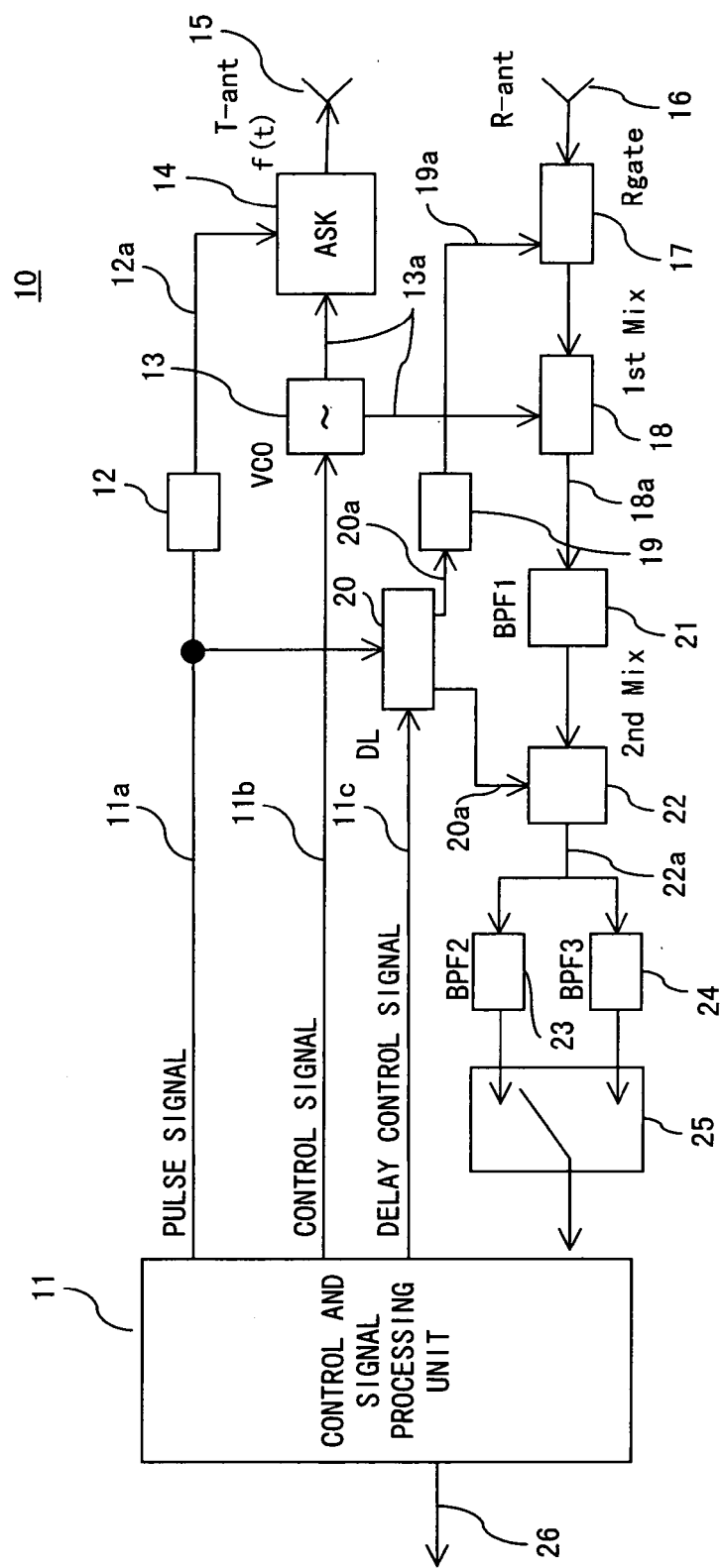
FIG. 7 is a block diagram exemplifying a modification of the radar apparatus according to the preferred embodiment of the present invention.

As a result, when the receiving unit is ON, the transmitter unit is OFF. Accordingly, the transmitter high-frequency signal can be prevented from being transferred from the transmitting unit to the receiver unit via the inside of the radar apparatus and an antenna, or a random accommodating the radar apparatus. FIG. 7 exemplifies a modification of the radar apparatus according to this preferred embodiment. The configuration shown in FIG. 7 is different from that shown in FIG. 2 in a point that a band-pass filter 24 (BPF3) (third band-pass filter) provided in parallel with the band-pass filter 23 (BPF2) and in correspondence with a beat frequency band different from the band-pass filter 23, and a switch 25 for switching between the outputs of the band-pass filters 23 and 24 and for inputting the output to the control and signal processing unit 11 are further comprised.

As an operation, in the FM-CW radar mode for long-range detection, the switch 25 is connected to the band-pass filter 23 (BPF2), whose high cut off frequency is the maximum value of a beat frequency. A process for the detection of the target range from the receiver high-frequency signal is executed in a similar manner as in the above described FIG. 4.

Figure 8:
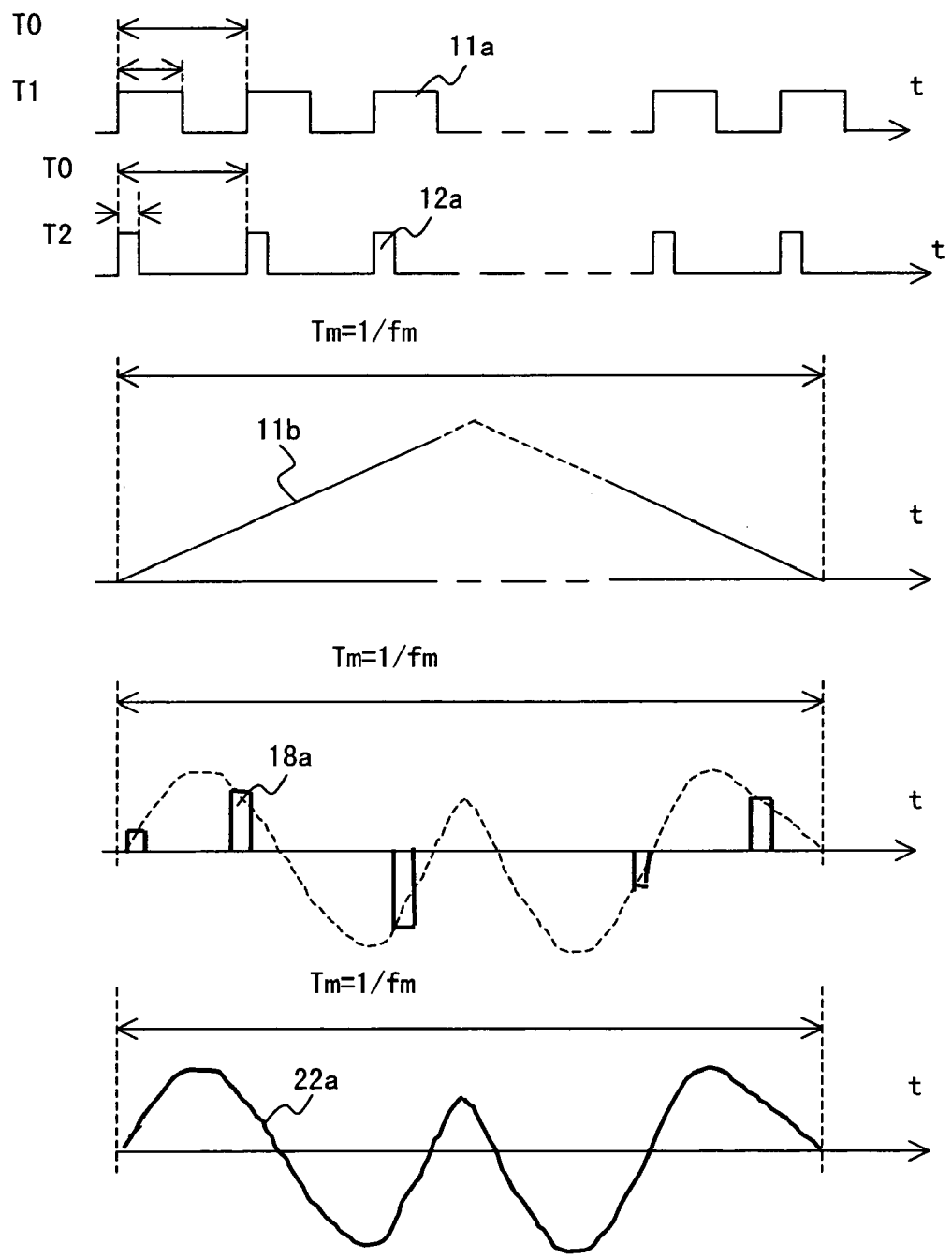
FIG. 8 is a diagram exemplifying a modification of the actions of the transmitting and the receiving units in the pulse radar mode of the radar apparatus according to the preferred embodiment of the present invention.

Unlike the FM-CW radar mode, a transmitter in the pulse radar mode for short-range detection is made by frequency-modulating (FM) the FM waveform signal 11b composed of a triangular wave of a cycle Tm (=1/fm) as shown in FIG. 8, and by amplitude-modulating the signal by the transmitter high-frequency ASK switching circuit 14 with the control pulse 12a of a cycle $T_0$ and an ON duration $T_2$. As a transmission wave, FM and AM composite modulation is made. For FM, an FM modulation frequency and a modulation width are controlled according to a detection distance, and a beat frequency on the receiver side is made constant regardless of the detection distance. This composite modulation wave is emitted from the transmitter antenna 15.

In the meantime, at the time of reception in the pulse radar mode, the timing of the gating pulse 19a is sliding-controlled by the programmable delay circuit 20 according to an instruction from the control and signal processing unit 11, and the receiver high-frequency signal passes from the receiver high-frequency gate circuit 17 only when the gating pulse 19a fits the propagation delay time of the transmitter high-frequency signal to the target. The output of the first mixer 18 becomes the second waveform from the bottom of FIG. 8, and the signal which passes through the IF filter 21 and the second mixer 22 becomes the lowest waveform of FIG. 8. This signal has a signal spectrum which concentrates on a frequency including the beat frequency fb and a Doppler shift. Therefore, the signal is made to pass through the band-pass filter 24 (BPF3) by the switch 25, whereby unexpected spectrum such as thermal noise outside the signal band and the useless noise is cut off, and only the signal spectrum is selected and output to the control and signal processing unit 11.

Figure 9:
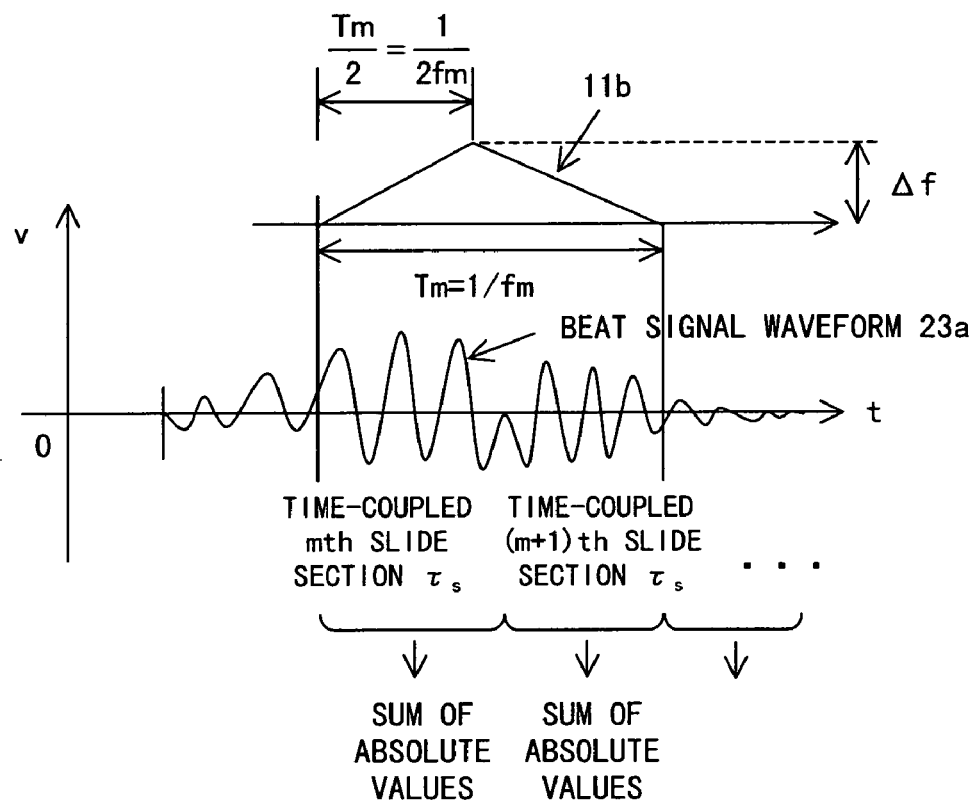
FIG. 9 is a diagram exemplifying a modification of the action of the receiving unit in the pulse radar mode of the radar apparatus according to the preferred embodiment of the present invention.
Figure 9:
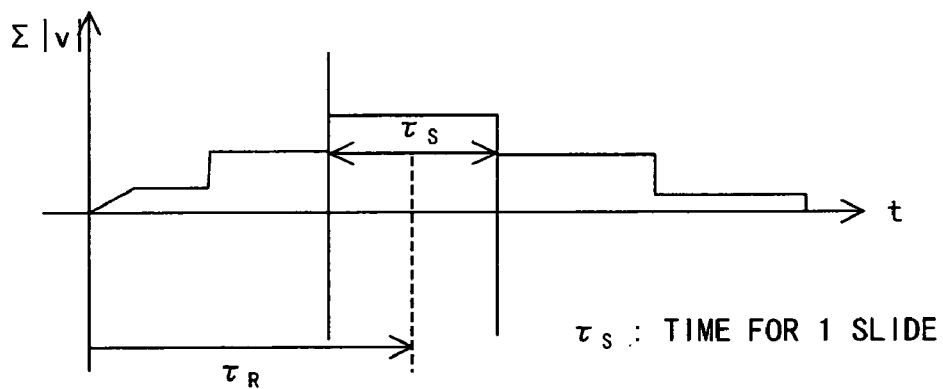

At this time, as exemplified in FIG. 9, a summation of absolute values of signal levels in an mth slide section (time length $\tau_s$), and an (m+1)th slide section (time length $\tau_s$), which respectively synchronized in times of up and down sections of the waveform of the receiver beat signal that is frequency-modulated with the triangular wave of the FM waveform signal 11b is calculated, and the distance R to the target can be obtained based on the above provided equation (6) by using the delay time ($\tau_R$) at the peak position of the summation of the absolute values.

Furthermore, $f_{bu}$, $f_{bd}$, and $f_d$ are obtained for a section Tm/2 (=½ $f_m$) of FIG. 9, whereby the distance R and the relative speed V of the target can be obtained based on the equations (4) and (5) as in the above described FIG. 4.

Namely, the distance R and the relative speed V of the target can be obtained with a pair (one measurement) of beat signals corresponding to the up and the down sections of a pair of frequencies.

The above provided explanation refers to the case where the time length τs, with which a signal level is calculated by making 1 slide, and the time of Tm/2 are equal. However, the timings of both of them are synchronous, they may have a relationship of an integral multiple or an integral submultiple.

Additionally, in this preferred embodiment, a detection distance is controlled with a delay time of sliding beforehand when an operation as the pulse radar mode is performed. Therefore, a beat frequency is controlled to be constant as follows even if the detection distance of the target varies.

Assuming that $f_m$ is an FM modulation frequency, Δf is a modulation width of FM modulation, and c is the velocity of light, the relationship between the distance R and the beat frequency fb in the FM modulation of the FM waveform signal 11b by using the triangular wave is as follows.

$$f_b = \frac{4 f_m \cdot \Delta f R}{c} \quad (7)$$

In the pulse radar mode in this preferred embodiment, a time during which the reception gate is open is delay-controlled with the delay control signal 11c from the control and signal processing unit 11 via the programmable delay circuit 20. Therefore, the distance R when the detection can be made makes a one-to-one correspondence with this delay time, and is sequentially controlled. Here, assuming that the beat frequency desired to be made constant even when the distance varies is $f_{b0}$, $$f_m \Delta f = \frac{f_{b0} c}{4R} \quad (8)$$

Additionally, a relationship between the detection distance R and the delay time τ of the gating of the receiver high-frequency signal in the receiver high-frequency gate circuit 17 is as follows.

$$\tau = \frac{2R}{c} \quad (9)$$

If R in the equation (9) is assigned to the equation (8), the following equation is obtained.

$$f_m \Delta f = \frac{f_{b0} c}{4R} = \frac{f_{b0}}{2\tau} \quad (10)$$

After all, if $f_m \Delta f$ is varied with the relationship represented by the equation (10) according to a change in the delay time τ for gating the receiver high-frequency signal, the beat frequency becomes a constant value $f_{b0}$. Additionally, the delay time τ for gating the receiver high-frequency signal is a time difference from when a pulse of the transmitter high-frequency signal is emitted until when the gate of the receiver high-frequency gate circuit 17 is opened.

Figure 10:
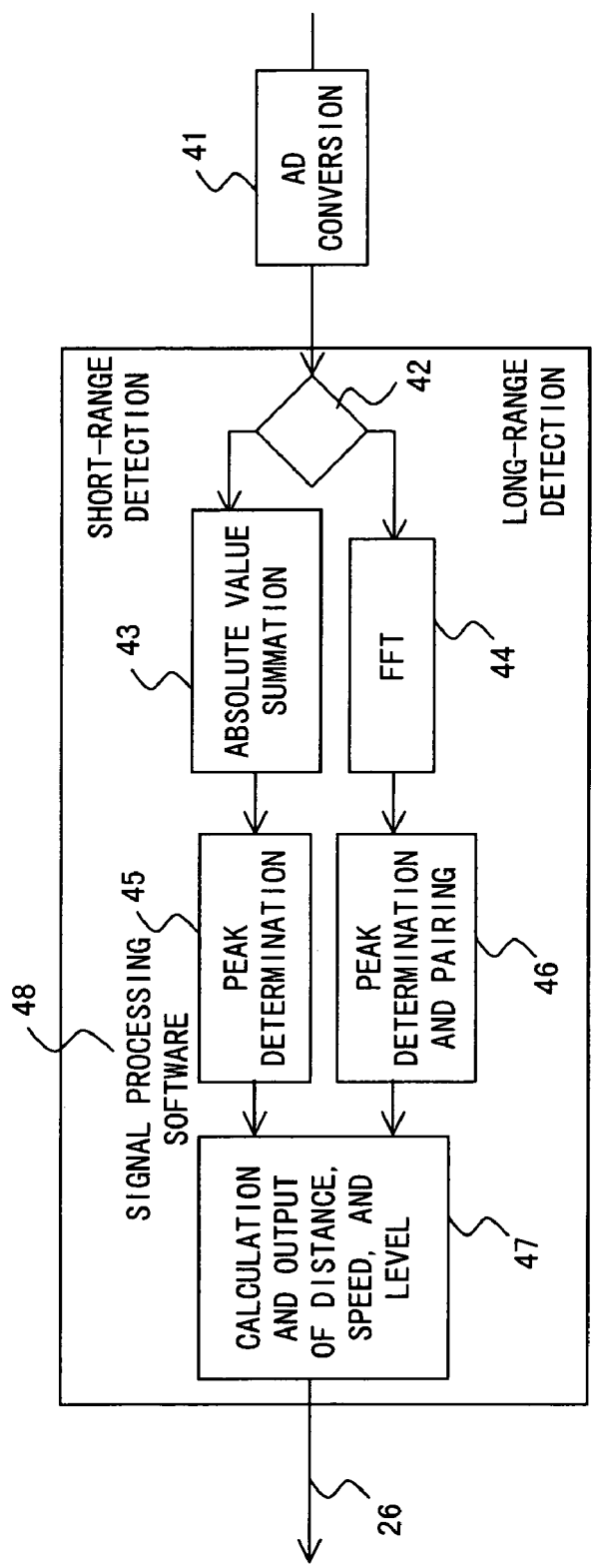
FIG. 10 is a block diagram exemplifying a configuration of signal processing software installed in the radar apparatus according to the preferred embodiment of the present invention.

FIG. 10 is a block diagram exemplifying a configuration of a signal processing software 48 installed in the control and signal processing unit 11 in this preferred embodiment.

In the pulse radar mode for short-range detection, this signal processing software 48 switches the beat signal, which is A/D-converted by the AD converting unit 41 within the control and signal processing unit 11, to the signal processing system of the pulse mode in a signal processing routine 42, and enters a section absolute value summation routine 43. A determination of a local maximum value of an absolute value summation level for each sliding time is made by a peak determination routine 45. Then, in a distance/speed/detection level calculation routine 47, the distance R to the target, which is calculated from the delay time of the sliding at that time, the relative speed V of the distance to a time change, a value, which is obtained by dividing an absolute value summation level by a section time, as a detection level are calculated, and externally output as detection result information 26.

In the FM-CW radar mode for long-range detection, the beat signal A/D-converted by the AD converting unit 41 is switched to the signal processing system of the FM-CW mode in the signal processing routine 42, and the software enters a section FFT routine 44. The local maximum value of the beat signal is obtained from the level value of each frequency obtained with FFT for each of the up and down sections of the triangular wave of the FM waveform signal 11b in a peak determination/pairing routine 46, the both beat signals to be paired are determined (pairing), and the distance R to the target, the relative speed V, and the reception signal level are externally output as the detection result information 26 by the distance/speed/detection level calculation routine 47.

Figure 11:
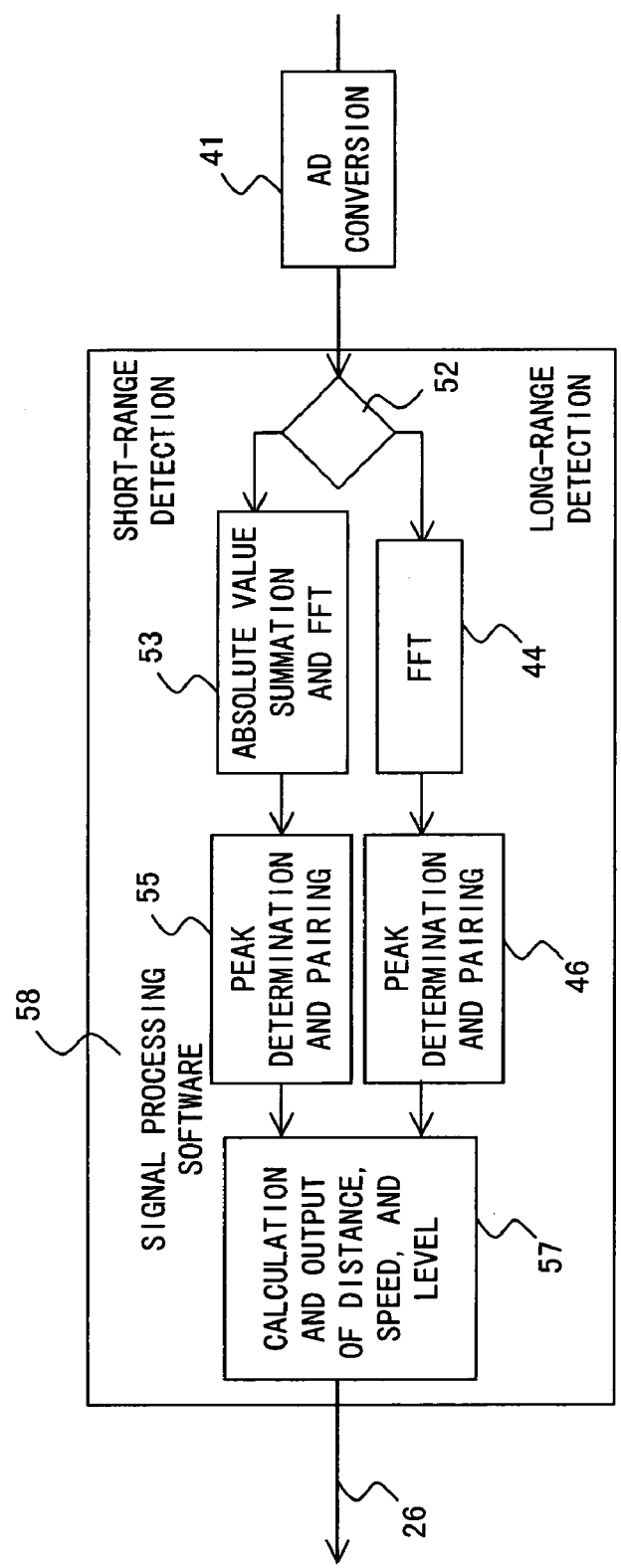
FIG. 11 is a block diagram exemplifying an another modification of a configuration of control software installed in the radar apparatus according to the preferred embodiment of the present invention.

FIG. 11 is a block diagram exemplifying a modification of a configuration of the signal processing software installed in the control and signal processing unit 11 in this preferred embodiment.

Signal processing software 58 exemplified in FIG. 11 is different from the above described signal processing software 48 shown in FIG. 10 in a point that both the section absolute value summation (the process shown in FIG. 9), and the FFT (the process shown in FIG. 4) are performed for each sliding in a signal level calculation routine 53 in the pulse radar mode for short-range detection, and a peak determination and a pairing of beat signals, which correspond to the up and the down sections of the triangular wave, are made in a peak determination/pairing routine 55.

Then, in a distance/speed/detection level calculation routine 57, a target distance is obtained with a sliding delay time ($\tau_R$) indicating the local maximum value of the section absolute value summation, and a Doppler frequency $f_d$ is obtained with ½ of a difference of frequencies of the pair resultant from the FFT performed for the up and the down sections when the local maximum value is slid, so that the relative speed V of the target can be calculated.

Namely, the distance R and the relative speed V of the target can be quickly obtained with a pair (one measurement) of receiver signals (beat signals) corresponding to the up and the down sections of the pair of frequencies.

Operations of the FM-CW radar mode for long-range detection are the same as those of the above described FIG. 10.

Figure 12:
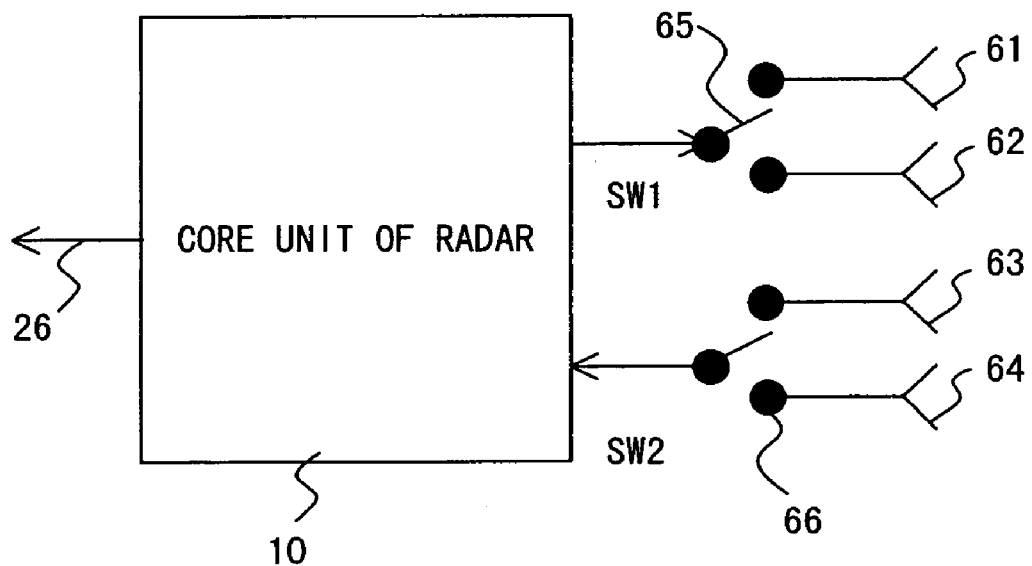
FIG. 12 is a conceptual schematic exemplifying a modification of the radar apparatus according to the preferred embodiment of the present invention.

FIG. 12 is a conceptual schematic exemplifying a modification of this preferred embodiment. In the modification example shown in FIG. 12, a plurality of types of antennas having different characteristics are provided, switched, and used as transmitter antennas 61 and 62, and receiver antennas 63 and 64, which are connected to the transmitter and the receiver units of the radar apparatus 10.

Namely, in the pulse radar mode for short-range detection, a transmitter signal output from the transmitting unit is connected by a switch 65 to the wide beam antenna 61 (second antenna) having a wide beam and a low gain characteristic, whereas a receiver signal is connected by a switch 66 to the wide beam antenna 63 (second antenna) having a wide beam and a low gain characteristic.

In the meantime, in the pulse radar mode for long-range detection, a transmitter signal is connected by the switch 65 to the narrow beam antenna 62 (first antenna) having a narrow beam and a high gain characteristic, whereas a receiver signal is connected by the switch 66 to the narrow beam antenna 64 (first antenna) having a narrow beam and a high gain characteristic.

With such switch operations of the antenna connections, a wide and short range can be detected by using the wide beam antenna 61 and the wide beam antenna 63 for transmitter and receiver in the pulse radar mode for detecting a short-range target. Or, in the FM-CW radar mode for detecting a long-range target, a target in a long, narrow, and restricted range can be detected by using the narrow beam antenna 62 and the narrow beam antenna 64 for transmitter and receiver.

The above described long-range detection and short-range detection, and the combinations of the wide and narrow beam antennas can be reversed from the above described example. Or, an antenna fixed on a transmitter or receiver side, and the other antenna only switched can be combined. Namely, an antenna combination can be set to vary depending on usage by the control software installed in the control and signal processing unit 11 comprised within the radar apparatus.

Figure 13:
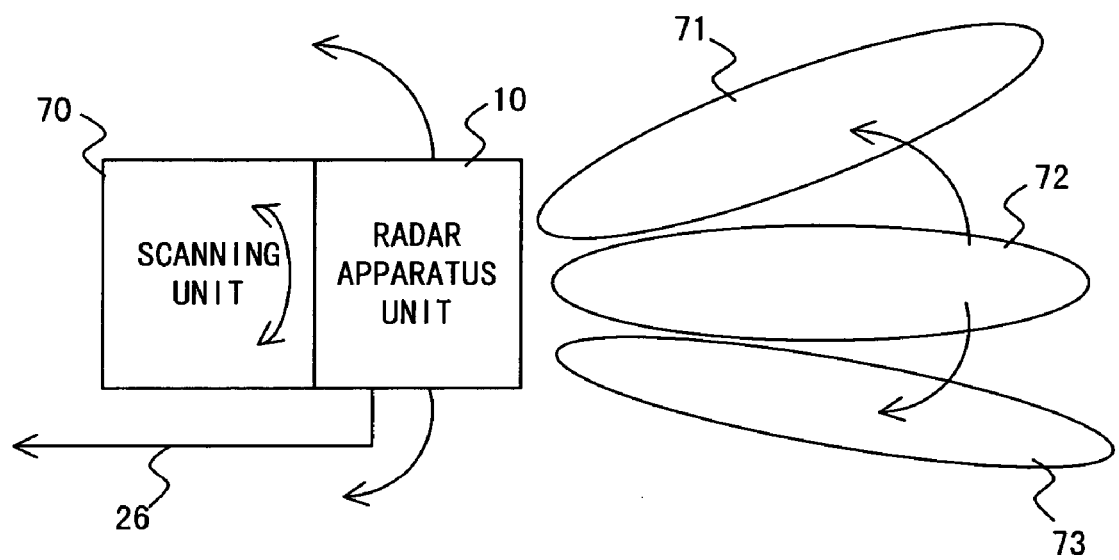
FIG. 13 is a conceptual schematic exemplifying a modification of the radar apparatus according to the preferred embodiment of the present invention.

FIG. 13 is a conceptual schematic exemplifying a modification of this preferred embodiment. In this modification example shown in FIG. 13, the whole of the radar apparatus 10 is mounted, for example, in a horizontal-direction scanning device 70 configured, for example, by a motor for sweeping (scanning) within a predetermined angle range on a horizontal plane, and a detection range using the radar beam of the radar apparatus 10 is controlled to change with time in the horizontal direction as radar beams 71, 72, and 73 in the sweeping (scanning) operation performed by the horizontal-direction scanning device 70. The operations of the horizontal-direction scanning device 70 are controlled by the control and signal processing unit 11 of the radar apparatus 10.

As a result, the radar apparatus 10 can detect the distance, the speed, and the detection level of the target for each sweeping angle as described above in the modification examples stated earlier. Therefore, the horizontal-direction angle of the target is determined by a scanning angle indicating the maximum value of a local detection level for a sweeping angle, and the distance, the speed, the horizontal-direction angle, and the detection level of the target can be output as the detection result information 26.

FIG. 14 is a conceptual schematic exemplifying a time-varying method for switching the operation modes.

In this figure, an operation time zone 81 is a time period during which long-range detection is made in the FM-CW radar mode. At the time of this long-range detection operation, beams transmitted/received by the antennas are narrowed by using the narrow beam antennas 62 and 64 on the transmitter and the receiver sides, the horizontal-direction scanning device 70 is made to perform a horizontal-direction scanning operation, and also an angle in the horizontal direction is detected with high accuracy. Since scanning is performed at this time, a detection time in one cycle is restricted by a scanning time.

An operation time zone 82 is a time period during which short-range detection is made in the pulse radar mode. At the time of this short-range operation, beams transmitted/received by the antennas are widened by using the wide beam antennas 61 and 63 on the transmitter and the receiver sides, scanning in the horizontal direction is not made, and the FFT is not employed at the time of the long-range operation, and only a signal amplitude summation is employed. As a result, a distance to a target within a beam can be quickly detected.

A summation of the operation time zones 81 and 82 is, for example, several tens to several hundreds of milliseconds, and the time zones can be repeatedly switched in this cycle.

For example, if forward monitoring is made by mounting the radar apparatus 10 according to this preferred embodiment in the front of a car, etc., ACC (Adaptive Cruise Control) can be assisted by long-range monitoring in the FM-CW radar mode, and a control for STOP & GO at the time of extremely low-speed cruising/stop in a traffic jam, or a control immediately before a pre-crash can be assisted with short-range monitoring in the pulse radar mode.

Furthermore, if backward monitoring is made by mounting the radar apparatus 10 according to this preferred embodiment in the rear of a car, a parking operation of a car into a parking lot can be assisted with so-called BUA (Back Up Aid) by using the close-range monitoring in the pulse radar mode.

As described above, one radar apparatus 10 can be used for diverse car controls.

Note that the present invention is not limited to the configurations exemplified in the above described preferred embodiments. The present invention can be diversely modified within a scope which does not deviate from the gist of the present invention as a matter of course.

According to the present invention, a radar apparatus that can detect a target in a wide range from a long to close range as one device at low cost can be provided.

What is claimed is:

1. A radar apparatus, comprising:
a transmitter unit having a high-frequency oscillating unit whose oscillation frequency is variable, and a pulse amplitude modulating unit for amplitude-modulating a pulse of a transmission high-frequency signal output from said high-frequency oscillating unit with a first control pulse signal;
a receiver unit having a gating unit for turning on and off an input of a reception high-frequency signal with a second control pulse signal; and
a controlling unit for controlling said transmitter unit and said receiver unit, and for switching between a first operation mode for making the apparatus function as an FM-CW radar and a second operation mode for making the apparatus function as a pulse radar; and wherein:
said receiver unit comprises a reception signal processing circuit having a first frequency converter for frequency-converting the reception high-frequency signal via the gating unit with an output of the high-frequency oscillating unit, a first band-pass filter provided on an output side of the first frequency converter, a second frequency converter for frequency-converting an output of the first band-pass filter with the first control pulse signal, and a second band-pass filter provided on an output side of the second frequency converter; and
said controlling unit makes the apparatus function as the FM-CW radar by switching to an FM-CW modulation mode for outputting the transmission high-frequency signal as a continuous wave, which is frequency-modulated by inputting a triangular wave to the high-frequency oscillating unit, and by making the first control pulse signal of said transmitter unit and the second control pulse signal of said receiver unit inversely operate to alternately make a transmission of the transmitter high-frequency signal and a reception of the receiver high-frequency signal, in the first operation mode, and
said controlling unit makes the apparatus function as the pulse radar by generating a short width pulse from the first control pulse signal and driving the pulse amplitude modulating unit, and by sliding the second control pulse signal of the receiver unit at a predetermined delay time interval from the first control pulse signal to gate the reception high-frequency signal, in the second operation mode.

2. The radar apparatus according to claim 1, wherein:
the receiving signal processing circuit comprises a third band-pass filter which is provided in parallel with the second band-pass filter and whose pass frequency band is different, and a switch for selecting the output of the second or the third band-pass filter; and
said controlling unit has a function for selecting the second band-pass filter of the receiving signal processing circuit, and for setting a band of the second band-pass filter to a maximum frequency of a beat frequency, which is a difference between frequencies of the transmission high-frequency signal and the reception high-frequency signal, when the apparatus functions as the FM-CW radar, and said controlling unit has a function for frequency-modulating the transmission high-frequency signal, and for switching to the third band-pass filter whose central frequency is the beat frequency, and whose pass band is set to a band width of a Doppler frequency according to a relative speed of a target in the reception signal processing circuit, when the apparatus functions as the pulse radar.

3. The radar apparatus according to claim 1, wherein said controlling unit has a function for changing a modulation frequency and a modulation width of frequency modulation of the transmission high-frequency signal according to a delay time of the gating unit so that a frequency of a beat signal obtained by mixing the transmission high-frequency signal and the reception high-frequency signal becomes constant, when the apparatus functions as the pulse radar.

4. The radar apparatus according to claim 1, wherein said controlling unit has a function for switching between FFT (Fast Fourier Transform) and computation of a summation of time sections so that the FFT is performed after A/D-converting a beat signal obtained by mixing the transmission high-frequency signal and the reception high-frequency signal, and a distance to a target is calculated with a frequency of a peak value of the FFT, when the apparatus functions as the FM-CW radar, or the distance to the target is calculated by using the delay time of the sliding, at which a summation of absolute values or a summation of square values, which are obtained by A/D-converted beat signal, —shows peak, when the apparatus functions as the pulse radar.

5. The radar apparatus according to claim 1, wherein said controlling unit has a function for quickly detecting a relative speed of a target with data of one measurement by performing FFT (Fast Fourier Transform) simultaneously with a calculation of a summation of absolute values of a difference from an average of preset time sections, or a summation of square values, and by calculating a Doppler frequency, when the apparatus functions as the pulse radar.

6. The radar apparatus according to claim 1, further comprising a first antenna having a narrow beam width, and a second antenna having a wide beam width, which are connected in common or individually to said transmitter unit and said receiver unit, wherein said controlling unit switches to the first antenna at the time of the first operation mode for making the apparatus function as the FM-CW radar, and switches to the second antenna at the time of the second operation mode for making the apparatus function as the pulse radar.

7. The radar apparatus according to claim 1, further comprising:

antennas connected in common or individually to said transmitter unit and said receiver unit; and a scanning mechanism for making an antenna scan in a horizontal direction, wherein said controlling unit has a function for detecting a target within a scanning range in the horizontal direction based on a scanning position in the horizontal direction by the scanning mechanism, and the receiver high-frequency signal.

8. The radar apparatus according to claim 1, further comprising:

antennas connected in common or individually to said transmitter unit and said receiver unit; and a scanning mechanism for making an antenna scan in a horizontal direction, wherein said controlling unit has a function for executing a detection process having a high resolution in the horizontal direction by making the scanning by the antenna in the first operation mode for making the apparatus function as the FM-CW radar, and a function for detecting a target within a beam of the transmission high-frequency signal emitted from the antenna at a high response speed without making the scanning by the antenna in the second operation mode for making the apparatus function as the pulse radar.

9. A method for controlling a radar apparatus for detecting a target in a receiver unit by detecting a wave, which is reflected from the target, of a transmission high-frequency emitted from a transmitter unit, comprising detecting the target during switching in a cyclic time interval between a first operation mode for frequency-modulating and radiating the transmission high-frequency, and a second operation mode for amplitude-modulating and radiating the transmission high-frequency, in the transmitter unit.

10. The method for controlling a radar apparatus according to claim 9, further comprising:

making the apparatus function as an FM-CW radar for detecting a distance and a relative speed of the target based on a FFT (Fast Fourier Transform) of a beat signal which is a difference of two frequencies; one is continuously emitting transmitter high-frequency signal which is frequency-modulated with a triangular wave as an oscillation frequency control signal in the transmitter unit; another one is a reflection wave from the target; the beat signal is obtained by mixing these two signal; and by detecting the two frequencies of beat signals respectively corresponding to up and down sections of the triangular wave, range and velocity of the target are detected, in the first operation mode; and making the apparatus function as a pulse radar for detecting the distance to the target according to a delay time with which a signal level of the reflection wave becomes a maximum by intermittently emitting a transmission high-frequency which is amplitude-modulated with a first control pulse signal in the transmitter unit, by performing gating for controlling presence/absence of an input of the reflection wave with a second control pulse signal in the receiver unit, by gating the reflection wave by sliding the second control pulse signal at a preset delay time interval from the first control pulse signal, in the second operation mode.

11. The method for controlling a radar apparatus according to claim 9, further comprising making the amplitude modulation after frequency-modulating the transmission high frequency by using a triangular wave as an oscillation frequency control signal in the second operation mode;

calculating a distance to a target with a frequency of a peak value of the FFT (Fast Fourier Transform) after A/D converting a beat signal obtained by mixing the reflection wave and the transmitter high-frequency, at the time of the first operation mode where the apparatus functions as the FM-CW radar; and switching between the FFT and computation of a summation of a time section so that the distance to the target is calculated by using a delay time of sliding, with which a sum or a sum of squares of absolute values, which is obtained based on a value after the beat signal is A/D-converted, of a difference from an average of a preset time section indicates a peak, at the time of the second operation mode where the apparatus functions as the pulse radar.

12. The method for controlling a radar apparatus according to claim 9, further comprising:
   amplitude-modulating the transmission high-frequency by using a triangular wave as an oscillation frequency control signal after frequency-modulating the transmission high frequency at the time of the second operation mode where the apparatus functions as the pulse radar; and
   quickly detecting a relative speed and the distance of the target with data of one measurement by performing the FFT simultaneously with computation of a sum or a sum of squares of absolute values of a difference from an average of a preset time section, and by measuring a Doppler frequency.

13. The method for controlling a radar apparatus according to claim 9, further comprising
   switching to a high gain antenna having a narrow beam width at the time of the first operation mode where the apparatus functions as the FM-CW radar and detects the target in a long range, and switching to a low gain antenna having a wide beam width at the time of the second operation mode where the apparatus functions as the pulse radar and detects the target in a short range.

14. The method controlling a radar apparatus according to claim 9, further comprising
   executing a detection process having a high resolution in a horizontal direction by making scanning in the horizontal direction at the time of the first operation mode where the apparatus functions as the FM-CW radar and detects the target in a long range, and quickly detecting a target within a beam of the transmission high-frequency signal emitted from a fixed antenna without making scanning in the horizontal direction at the time of the second operation mode where the apparatus functions as the pulse radar and detects the target in a short range.

* * * * *

UNITED STATES PATENT AND TRADEMARK OFFICE
CERTIFICATE OF CORRECTION

| | |
|---|---|
| PATENT NO. | : 7,148,840 B2 |
| APPLICATION NO. | : 10/999974 |
| DATED | : December 12, 2006 |
| INVENTOR(S) | : Yoshikazu Dooi et al. |

It is certified that error appears in the above-identified patent and that said Letters Patent is hereby corrected as shown below:

On Title Page
item 56
First Page, Column 2 (Foreign Patent Documents), Line 1, change "6-2499944" to --6-249944--.

Column 13, Line 34, change "-shows" to --shows--.

Signed and Sealed this

Tenth Day of April, 2007

JON W. DUDAS
*Director of the United States Patent and Trademark Office*